March 25, 1958     W. R. KING     2,828,190
RECYCLE CONTROL FOR CARBON BLACK PELLET MILL
Filed Sept. 7, 1954     2 Sheets-Sheet 1
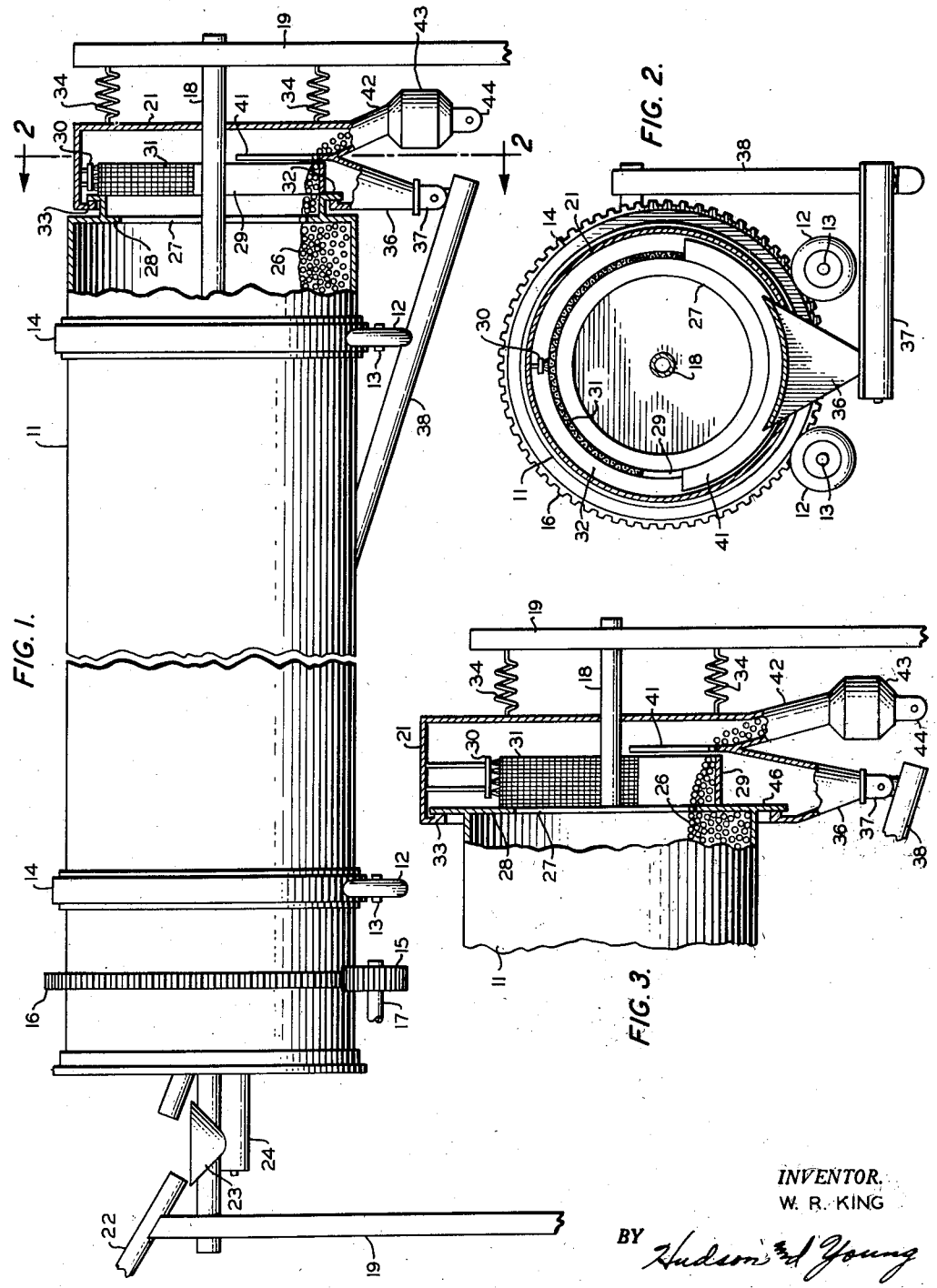
INVENTOR.
W. R. KING
BY *Hudson and Young*
ATTORNEYS March 25, 1958 W. R. KING 2,828,190
RECYCLE CONTROL FOR CARBON BLACK PELLET MILL
Filed Sept. 7, 1954 2 Sheets-Sheet 2
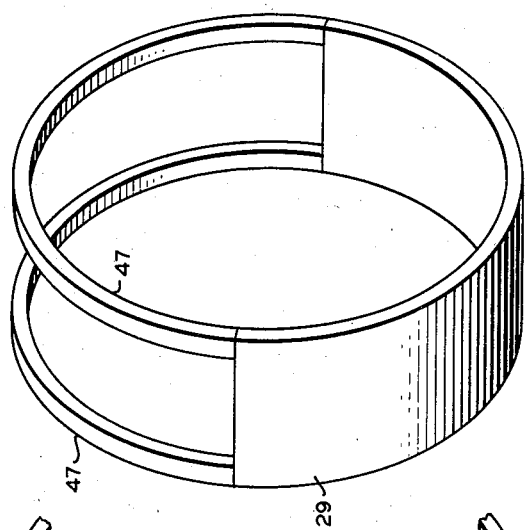
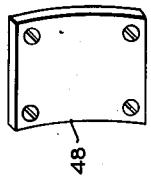
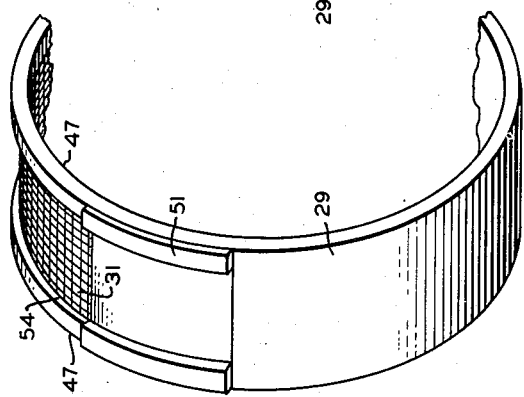
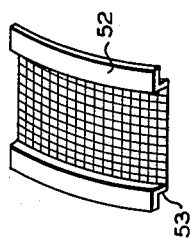
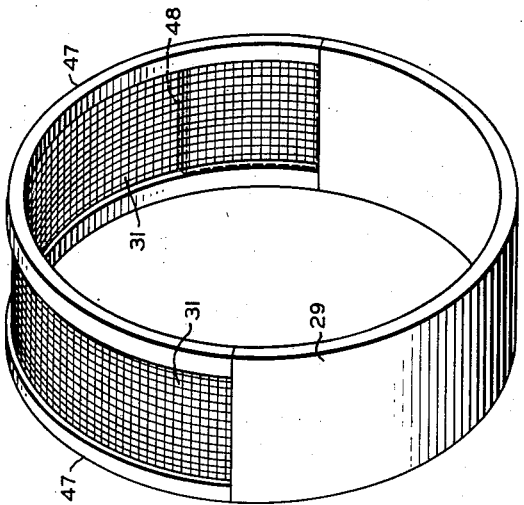
INVENTOR.
W. R. KING
BY *Hudson & Young*
ATTORNEYS United States Patent Office 2,828,190
Patented Mar. 25, 1958

2,828,190

RECYCLE CONTROL FOR CARBON BLACK PELLET MILL

William R. King, Bartlesville, Okla., assignor to Phillips Petroleum Company, a corporation of Delaware Application September 7, 1954, Serial No. 454,326

30 Claims. (Cl. 23—313)

This invention relates to an improved process and apparatus for pelleting powdered pelletable materials. A specific aspect of the invention is concerned with pelleting loose carbon black.

This application is a continuation-in-part of my copending application Serial No. 394,956, filed November 30, 1953, now abandoned.

It is conventional to pellet various powdered materials such as clay, aluminum oxide, and other metal oxides and mixtures thereof for adsorbent and catalytic uses, and, particularly, carbon black, by subjecting the material to a rolling action in horizontally elongated, cylindrical drums. The loose powdered material is delivered to the pelleting drum or mill at one end thereof and passes through the mill to the opposite end, where it is recovered as it passes over weirs or through openings disposed at a predetermined distance from the periphery of the mill. In this manner the weirs or openings rotate with the drum and, when in the lower portion of their arc of rotation, tend to regulate the depth of the pellets in the delivery end of the drum by permitting the pellets in the pellet bed in the mill standing above the level of the weir or opening to pass out the end of the mill and be recovered as products of the pelleting process.

It has been found particularly advantageous to the production of uniform pellets to recycle a substantial proportion, such as 25 to 75 weight percent, of the effluent pellets from the delivery end to the feed end of the mill. A common method of proportioning the flow of the effluent product stream to the feed end of the mill is by means of a screening and/or orifice device below the hood of the mill which is usually designed to pass approximately 50% of the effluent stream to recycle. The difficulties and disadvantages in this type of apparatus and method of recycle are numerous and result in frequent shutdown of the mill with attendant loss in production. The screen and orifice are very inadequate in proportioning the recycle and are very susceptible to blinding or plugging by scale, which is in the effluent pellet stream and must be separated from the recycle pellet stream in order to prevent the mill going to loose black. In addition, the proportioning device in conventional use required a separate drive arrangement which is subject to mechanical failure with attendant shutdown.

Another disadvantage lies in the fact that the conventional external screening arrangement below the mill end requires several feet of head room, which in turn greatly increases the cost of construction of the mill because of the added height. Moreover, the nearly horizontal screens are difficult to clean and are therefore subject to blinding and subsequent interruption of the entire pelleting process.

My invention has a number of objects which include the following: to provide an improved process and apparatus for pelleting powdered materials, such as carbon black; to provide a process and apparatus which materially reduces or eliminates the blinding of the screening device utilized in a pelleting process or apparatus; to provide a process and apparatus which permits adequate control of the portion of the effluent pellet stream recycled to a pelleting process; to provide a pelleting apparatus which reduces construction costs and effects economy in operation. Other objects of the invention will become apparent from a consideration of the accompanying disclosure.

My invention provides a device built into the outlet end plate of the pelleting mill which accomplishes the objects of the invention and eliminates all of the disadvantages of the screening and proportioning devices of the prior art as set forth above. The delivery end of the mill contains a central or axial opening which provides a continuous weir for controlling the depth of the pellet bed in the mill. In one embodiment of the invention a short cylindrical section, a portion of which is in the form of the screen, and the remaining portion in the form of an imperforate band, or plate, is fixed to the delivery end of the mill coaxial therewith and of such diameter as to be disposed radially outside of the opening in the delivery end of the mill. In this manner the cylindrical section containing the screen rotates with the mill and continuously receives the effluent pellet stream from the mill. When the screen section passes under the effluent stream, the pellets pass through the screen and are received by a separate receptacle which delivers the same to a recycle conveyor, and when the imperforate plate section passes under the effluent pellet stream, the pellets pass over the imperforate plate and are delivered off the downstream edge thereof to a second pellet receiving device downstream of the receptacle for recycle pellets and are delivered to the product conveyor. The portion of the effluent pellet stream recycled to the feed end of the mill is adequately controlled by proportioning the screen and imperforate sections of the cylindrical member attached to the delivery end of the mill.

In another embodiment of the invention the screen section is omitted entirely so as to leave a blank or dropout zone in the section of the band or ring which the screen occupied in the first-described embodiment of the invention. Omission of the screen section has the advantage of avoiding certain abrasion of the pellets as they pass over and through the screen section. Another advantage of providing a blank space for drop out of the pellets lies in the saving in space required for the pellet-separating means of the invention. It has been found in some applications of the invention to carbon black pelleting that a screen of a width of about 12 inches is required in order to allow substantially all of the pellets passing onto the screen section to pass through the screen. In some mills there is insufficient room under the hood to accommodate a cylindrical section including the imperforate and screen sections of a width sufficient to pass all of the pellets through the screen of that portion passing onto the screen. In one application a band six inches wide providing a six-inch wide screen was insufficient to provide adequate time for the pellets to pass through the screen and some of them consequently passed over into the product receiver.

A more complete understanding of the invention may be had from a consideration of the drawing in which:

Figure 1 is an elevation, partly in section, of a pellet mill showing one embodiment of the invention;

Figure 2 is a transverse section of the mill of Figure 1 taken on the line 2—2;

Figure 3 is a partial section of the delivery end of the mill showing a different embodiment of the invention than that of Figure 1;

Figure 4 is an isometric view of one embodiment of the cylindrical screening member attached to the delivery end of the mill;

Figure 5 is an isometric view of plate designed to fit ring 29 between ribs 47, as shown in Figure 4;

Figure 6 is an isometric view of a partial section of ring 29 showing a detachable plate section 51;

Figure 7 is an isometric view of a screen section which is interchangeable with plate section 51 of Figure 6; and Figure 8 is an isometric view of one embodiment of a product stream separation member to be attached to the delivery end of a mill. Each of the figures is schematic.

Referring to Figure 1, a cylindrical drum 11 is supported by means of a series of wheels 12 supported on axles 13 parallel with the axis of drum 11 and disposed on either side of the vertical plane of the mill in the manner shown in Figure 2. Wheels 12 either ride directly on the mill shell or on metal bands 14 which serve as a track. The mill is driven by means of a driving gear 15 and a driven gear 16 by motive power (not shown) operating through axle 17. An axial pipe 18 passes through the mill and is supported at either end by posts or piers 19. Center pipe 18 supports a scraping device (not shown) inside of the mill and also a hood 21 at the delivery end of the mill. The material to be pelleted is supplied to the mill from delivery line 22 which feeds the pelletable material into a hopper 23 on a conveyor 24 which passes through the feed end of the mill and delivers the material to be pelleted to a point a suitable distance from the end of the mill. Conveyor 24 is preferably a screw-type conveyor, but any device which moves the material to be pelleted into the mill is satisfactory.

As the mill is rotated, a bed of pellets 26 is built up and maintained therein, and as the feed is continuously added at the feed end of the mill, the pellet bed reaches the level of outlet opening 27 in mill end plate 28. The inside edge of mill end plate 28 functions as a weir for controlling the depth of the pellets fed into the mill so that the pellet bed builds up to the level of the opening and thereafter flows over the weir to provide an effluent pellet stream from the mill. Short cylindrical section 29 is affixed to the outside surface of mill end plate 28 coaxially with the mill. Thus cylindrical member 29 is of larger diameter than end plate opening 27 so that pellets passing over the edge of the weir are received on the internal surface of said cylindrical member.

Cylindrical member 29 is fabricated of imperforate sheet throughout, with the exception of a circumferential section 31 which is fabricated of screen of suitable mesh so as to pass pellets from the mill while retaining scale contained in the effluent stream. Screen section 31 may extend any proportion of the circumference of the cylindrical member desired but usually occupies from 25 to 75% thereof. In most applications screen 31 will extend around one-half of the circumference of cylindrical member 29. In another modification of the structure of the invention screen 31 and its annular imperforate continuation may be fabricated as a unit and attached to cylindrical member 29 at flange 32 by welding, or other suitable means. Radially extending flange 32 provides a means of sealing the end of the mill with hood 21 which is of larger diameter than the flange and has an inwardly projecting member 33 which contacts flange 32 in sealing engagement. Springs 34, or other suitable tension devices, serve as means for holding hood 21 in sealing engagement with flange 32.

A brush 30 is affixed to hood 21 at or near the top thereof in engaging and brushing relation with screen 31 when it passes through the upper portion of its arc of rotation. In this manner coating of the screen with carbon or other material being pelleted is avoided and any scale that might tend to plug the openings and blind the screen is removed, although this problem is not critical because of the inversion of the screen on each revolution of the mill. Brush 30 may be fabricated of metal wire, such as brass, or of any suitable stiff fiber, such as nylon, which will withstand temperatures which prevail under the hood.

The effluent pellets passing through screen 31, when the same is in the lower position of its arc of rotation, are recovered in receiver 36, which is preferably an integral part of the hood 21 and is disposed directly below cylindrical member 29 and its associated screen. The pellets passing to receptacle 36 are gravitated into transverse conveyor 37 which feeds into recycle conveyor 38, for delivery to hopper 23 and return to the mill. Elevator 38 is shown delivering recycled material to conveyor 24, but in some mills a separate conveyor is provided which delivers the recycled pellets into the mill at a point closer to the end plate of the mill than the delivery point of the loose black to the mill.

Effluent pellets passing over the imperforate section of cylindrical member 29 are conveyed downstream of dividing plate 41 so that they pass into chute 42 which is attached to the hood of the mill. Product pellets are received in hopper 43 which delivers the same to product conveyor 44 for delivery to packaging or storage.

In Figure 2 the corresponding parts are identified by the same numerals as utilized in Figure 1. Figure 2 provides a clearer understanding of the arrangement of divider member 41 which separates the recycle pellets from the product pellets.

Figure 3 shows a modification of the delivery end of the mill in which the end plate 28 extends radially beyond the periphery of mill 11 and provides an extending radial flange 46. This structure cooperates with a flange 33 on hood 21 to provide sealing engagement therebetween. In this embodiment the screen section of short cylindrical member or flange 29 is contiguous to plate 28 and no radial flange on the member is required, as is the case in the modification shown in Figure 1. In other respects the structure of Figure 3 is similar to that of Figure 1 and corresponding parts are similarly designated.

Figure 4 shows in more detail one modification of cylindrical member or flange 29, containing a screen 31. This member may be fabricated of sheet iron, steel, or other suitable metal, with a portion of the metal cut away, leaving the rims or beads 47 of the cylindrical section for supporting screen 31. Cylindrical member 29 may be fabricated in any suitable manner with the screen section disposed at the inner surface, at the outer surface, or intermediate the outer and inner surfaces of the cylindrical section. One method is to fix the screen to beads 47 near the outside periphery thereof so as to leave room to insert one or more impervious metal plates 48 (Fig. 5) on the inside of the screen, thereby blinding that portion of the screen covered by the plates and changing the proportion of pellets to be fed to recycle. The inside surfaces of plates 48 should be smooth with counter-sunk bolt or screw heads so that effluent pellets pass over the same without material obstruction. Plates 48 are desirably of less thickness than the imperforate section so as to be flush therewith. It is within the scope of the invention to fabricate cylindrical member or flange 29 to include screen 31 in any manner within the skill of the art. Cylindrical member 29 may be fastened to end plate 28 in any suitable manner, such as by welding or by means of brackets affixed to the outside periphery of the cylindrical member and the end plate. A 4 mesh screen attached to ¼″ metal plate has been found suitable on a mill 8′ x 48′.

Plate 48 of Figure 5, when bolted or otherwise attached to ring 29 as shown by dotted lines in Figure 4, is in line with the solid section of the ring so as to form a smooth juncture therewith.

It is also feasible to construct a portion of the screen section of one or more removable screens and provide interchangeable imperforate plates to replace the screens when the proportion of screen is to be reduced in order to lower the recycle ratio. This structure is shown in Figure 6 and Figure 7. Shoulder 53 of Figure 7 is of the approximate depth of shoulder 54 of Figure 6 so as to bring the screen section of 52 into line with the screen section of ring 29 when it replaces plate section 51.

Figure 8 shows a band or ring portion which attaches to the end of a pellet mill in the same manner as the ring member shown in Figures 1, 2, and 3. In this embodiment of the invention, a blank or drop out space 56 in the band or ring is provided which permits a portion of the pellet stream flowing from the delivery end of the mill to pass directly to receiver 36 without obstruction by a screen. Another portion of the effluent pellet stream passes over solid imperforate section 29 to product receiver 42. In a modification of the member shown in Figure 8, bead 47 on either side of the band may be omitted so that the element attached to the delivery end of the mill coaxially therewith is arcuate imperforate member 29 which comprises a portion of a band or ring. Element 29 may be constructed to occupy any suitable portion of the circumference of the band to provide the desired proportion of recycle and product recovery pellets. The usual length of element 29 is in the range of ¼ to ¾ of a circumference so as to provide a recycle in the range of 75 to 25 percent of the pellets egressing from the mill, but the same may be of lesser or greater length where desired. One or more sections such as 51 of Figure 6 may be utilized to increase or decrease the length of the solid band of Figure 8. Element 29 may be fastened to the mill end by welding, by suitable brackets not shown, or by any convenient means.

It has been found that a pellet mill constructed in accordance with the invention permits the lowering of a conventional mill by at least two or three feet, thereby decreasing construction costs. It also accomplishes the other objects of the invention set forth herein.

Numerous modifications of the invention can be made within the scope of the preceding disclosure. It should be realized that the illustrative details set forth herein are merely explanatory and should not be construed as unnecessarily limiting the invention.

I claim:

1. A pellet mill comprising a horizontally elongated rotatable cylindrical drum having means therein for introducing to one end thereof material to be pelleted; an end-plate closure member on the other end of said drum having an opening therein spaced from the periphery of said drum for egress of pelleted material; an arcuate imperforate member in the form of a portion of a band concentric with said drum and fixed to the outside of said end-plate radially outside of the opening therein, said arcuate member providing a conveying surface for pellets from said end-plate to receiving means downstream of said arcuate member; receiving means directly below said arcuate member for receiving pellets directly from said end-plate when said arcuate member is in the upper portion of its arc of rotation; and separate receiving means directly below the downstream edge of said arcuate member for receiving pellets delivered over said edge.

2. The apparatus of claim 1 wherein said arcuate member is of a circumferential length in the range of ¼ to ¾ of a complete circle.

3. A pellet mill comprising a horizontally rotatable drum having a feed end and a delivery end; an end closure plate on each end of said drum; means for introducing solid particulate material to be pelleted to the feed end of said drum; an axial opening in the delivery end-plate substantially smaller than the end of said drum providing a continuous weir for regulating the depth of a bed of said material in said drum; a section of a band or ring fixed coaxial to said drum on the outside surface of said delivery end-plate radially outside of said axial opening adapted to provide conveying means for pellets downstream from said end-plate during a portion of the rotation cycle of said mill and a direct fall-thru for pellets during the remaining portion of said cycle; a first stationary receiving means directly below said band; a separate second stationary receiving means directly below the downstream lip of said band for receiving pellets conveyed over said band, and means for conveying pellets from said first receiver means to the feed end of said drum.

4. The mill of claim 3 including a stationary hood enclosing and substantially sealing the delivery end of said drum.

5. The mill of claim 4 in which said first and said second receiving means are fixed to said hood.

6. A pellet mill comprising a horizontally elongated rotatable cylindrical drum having means in one end for introducing material to be pelleted and outlet means in the other end intermediate the circumference and axis and having a section of a band or ring attached to the outlet end of said drum coaxially therewith radially outside of said outlet means adapted to revolve with said drum and separate pellets egressing from said outlet means into two separate streams.

7. The mill of claim 6 including separate means for receiving said streams of pellets.

8. A pellet mill comprising a horizontally elongated rotatable cylindrical drum having means in one end for introducing material to be pelleted and outlet means in the other end intermediate the circumference and axis and means on the end of said drum for gravitating pellets therethru during a substantial portion of one revolution of said drum to a first collector and for conveying pellets during the remaining portion of said revolution to a second collector.

9. A pellet mill comprising a horizontally elongated rotatable cylindrical drum having means therein for introducing to one end thereof material to be pelleted; an end-plate closure member on the other end of said drum having an opening therein spaced from the periphery of said drum for egress of pelleted material; a relatively short substantially cylindrical member coaxial with said drum, attached to said end-plate exteriorly of said drum, and radially outside of said opening, said cylindrical member comprising an imperforate section and a screen section, one of said sections succeeding the other around the circumference of said member; receiving means directly below said cylindrical member adapted to receive pellets falling through said screen section; and separate receiving means directly below the downstream end of said cylindrical member adapted to receive pellets delivered over said imperforate section.

10. A pellet mill comprising a horizontally rotatable drum having a feed end and a delivery end; an end closure plate on each end of said drum; means for introducing solid particulate material to be pelleted to the feed end of said drum; an axial opening in the delivery end-plate substantially smaller than the end of said drum providing a continuous weir for regulating the depth of a bed of said material in said drum; a substantially cylindrical flange attached to the outside face of said delivery end-plate radially outside of said opening and coaxial with said drum, said cylindrical flange comprising an imperforate section and a screen section, one of said sections succeeding the other around the circumference of said flange; a first stationary receiving means directly below said screen section for receiving pellets passing through said screen section; a separate second stationary receiving means directly below the downstream lip of said imperforate section for receiving pellets passing over said imperforate section; and pellet conveyor means leading from said first receiving means to the feed end of said drum.

11. The mill of claim 10 including a stationary hood enclosing and substantially sealing the delivery end of said drum.

12. The mill of claim 11 in which said first and said second receiving means are fixed to the lower portion of said hood.

13. The mill of claim 10 including a stationary brush disposed in engaging relation with the convex surface of said screen.

14. The mill of claim 10 in which the delivery endplate extends radially beyond the drum shell so as to form a radial flange for engagement with a hood to cover the delivery end of said drum.

15. The mill of claim 14 including a stationary hood enclosing the delivery end thereof, said hood encompassing the radial flange extending beyond said drum and engaging the upstream face thereof so as to form an annular seal therewith, and means for holding said hood in sealing relation with said flange.

16. The mill of claim 10 including a radial flange fixed to said cylindrical flange intermediate its ends and extending outwardly therefrom so as to provide an engaging seal for a hood surrounding the delivery end of said drum, said screen section being downstream of said radial flange.

17. The mill of claim 16 including a stationary hood enclosing the delivery end thereof, said hood encompassing the radial flange on said cylindrical flange and engaging the upstream face thereof so as to form an annular seal therewith, and means for holding said hood in sealing relation with said radial flange.

18. The mill of claim 9 in which said cylindrical member comprises a section of interchangeable screen and imperforate plate.

19. The mill of claim 10 in which said cylindrical flange contains at least one removable imperforate plate superimposed on a short section of said screen so as to provide for varying the proportions of screen and imperforate sections in said member.

20. The apparatus of claim 19 in which said plate covers the inside surface of said screen and is flush with said imperforate section of said member.

21. A process for pelleting powdered pelletable material comprising maintaining a bed of said material in a rotating tumbling zone so as to form pellets of said material; adding said material to one end of said zone so as to cause a stream of pellets to flow from the top portion of said bed at the opposite end; during one-fourth to three-fourths of a cycle of rotation, passing the effluent pellets over an imperforate transfer zone adjacent the discharge end of said tumbling zone to a receiver downstream of the discharge end of said tumbling zone; during the remaining portion of said cycle, gravitating the effluent pellets directly from the delivery end of said tumbling zone to a receiver therebelow.

22. A process for pelleting powdered pelletable material comprising maintaining a bed of said material in a rotating tumbling zone so as to form pellets of said material; adding said material to one end of said zone so as to cause a stream of pellets to flow from the top portion of said bed at the opposite end; passing all of said stream for a portion of cycle of rotation over an imperforate lateral transfer zone to a downstream receiver; and gravitating all of said stream for another portion of said cycle of rotation from the downstream end of said tumbling zone thru a drop-out zone to a separate receiver upstream of said downstream receiver.

23. A process for pelleting powdered pelletable material comprising maintaining a bed of said material in a rotating tumbling zone so as to form pellets of said material; adding material to one end of said zone so as to cause a stream of pellets to flow from the top portion of said bed at the opposite end; passing all of said stream for a given interval downwardly thru a screening zone adjacent the downstream end of said tumbling zone to a first collecting zone; and passing all of said stream for a succeeding interval over an impervious lateral supporting and transfer zone to a second collecting zone downstream of said first collecting zone; recycling pellets from one of said collecting zones as feed to said mill.

24. The process of claim 15 in which the recycle is from the screened portion.

25. The process of claim 23 in which the recycle is from the unscreened portion.

26. The process of claim 23 wherein screening zone and said impervious lateral supporting and transfer zone are rotated coaxially with said tumbling zone so as to alternately pass under said pellet stream.

27. A process for pelleting powdered pelletable material comprising maintaining a bed of said material in a rotating tumbling zone so as to form pellets of said material; adding material to one end of said zone so as to cause a stream of pellets to flow from the top portion of said bed at the opposite end; separating said stream of pellets into two separate streams by passing same thru a separation zone wherein one of said streams is obtained by passing all of said stream for a given interval thru a screening zone to a first collecting zone below same and the other of said streams is obtained by passing all of said stream for a succeeding interval across an impervious supporting zone above said first collecting zone to a locus downstream of said first collecting zone, and allowing same to gravitate to a second collecting zone downstream of said first collecting zone.

28. A process for pelleting powdered pelletable material comprising maintaining a bed of said material in a rotating tumbling zone so as to form pellets of said material; adding said material to one end of said zone so as to cause a stream of pellets to flow from the top portion of said bed at the opposite end; dividing the effluent stream of pellets into two separate streams by alternately passing same as it emerges from said zone over a smooth continuous lateral surface and over the downstream edge thereof to a collector during a portion of a revolution of said zone and then gravitating said stream directly to another collector upstream of first said collector during another portion of a revolution.

29. The process of claim 28 including recycling one of said portions to the feed end of said zone.

30. The process of claim 28 including recycling the portion of said stream collected in the upstream collector to the feed end of said zone and passing the other portion recovered in the downstream collector to product recovery.

References Cited in the file of this patent

UNITED STATES PATENTS

| | | |
|---|---|---|
| 987,554 | Coggeshall | Mar. 21, 1911 |
| 1,025,185 | Gruss et al. | May 7, 1912 |
| 1,980,130 | Fasting | Nov. 6, 1934 |
| 1,994,718 | Lellep | Mar. 19, 1935 |
| 2,127,137 | Price | Aug. 16, 1938 |
| 2,158,513 | Lloyd | May 16, 1939 |
| 2,287,759 | Hardesty | June 23, 1942 |
| 2,543,898 | De Vaney | Mar. 6, 1951 |
| 2,638,625 | Studebaker | May 19, 1953 |

UNITED STATES PATENT OFFICE
CERTIFICATE OF CORRECTION

Patent No. 2,828,190                                                        March 25, 1958

William R. King

It is hereby certified that error appears in the printed specification of the above numbered patent requiring correction and that the said Letters Patent should read as corrected below.

Column 3, line 26, for "mil" read -- mill --; column 8, line 9, for the claim reference numeral "15" read -- 23 --; same column 8, list of references cited, insert the following:

2,308,578   White et al  - - - - Jan. 19, 1943

Signed and sealed this 3rd day of March, 1959.

(SEAL)

Attest:

KARL H. AXLINE
Attesting Officer

ROBERT C. WATSON
Commissioner of Patents